Jan. 31, 1956     E. H. T. BENSEMANN     2,732,552
BOX NAILING MACHINES
Original Filed March 5, 1948     8 Sheets-Sheet 4
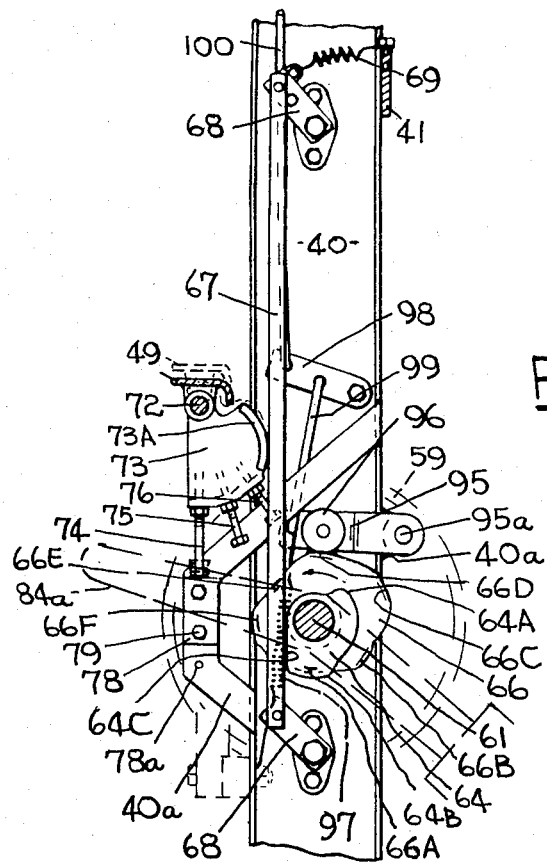
Fig. 6
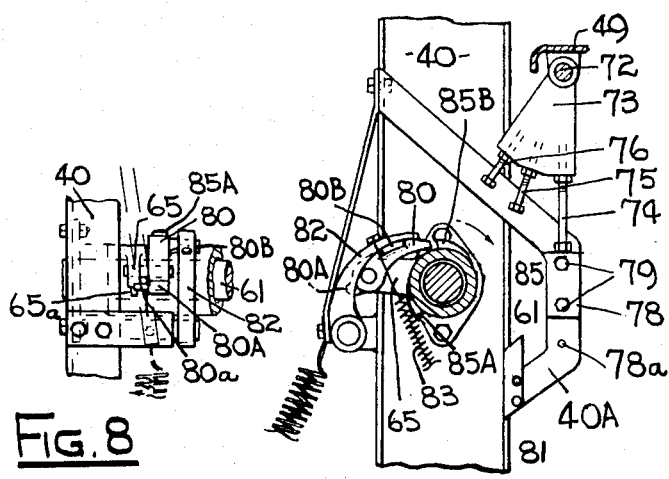
Fig. 7
Fig. 8
INVENTOR
E.H.T. BENSEMANN
By Young, Emery & Thompson
ATTYS.

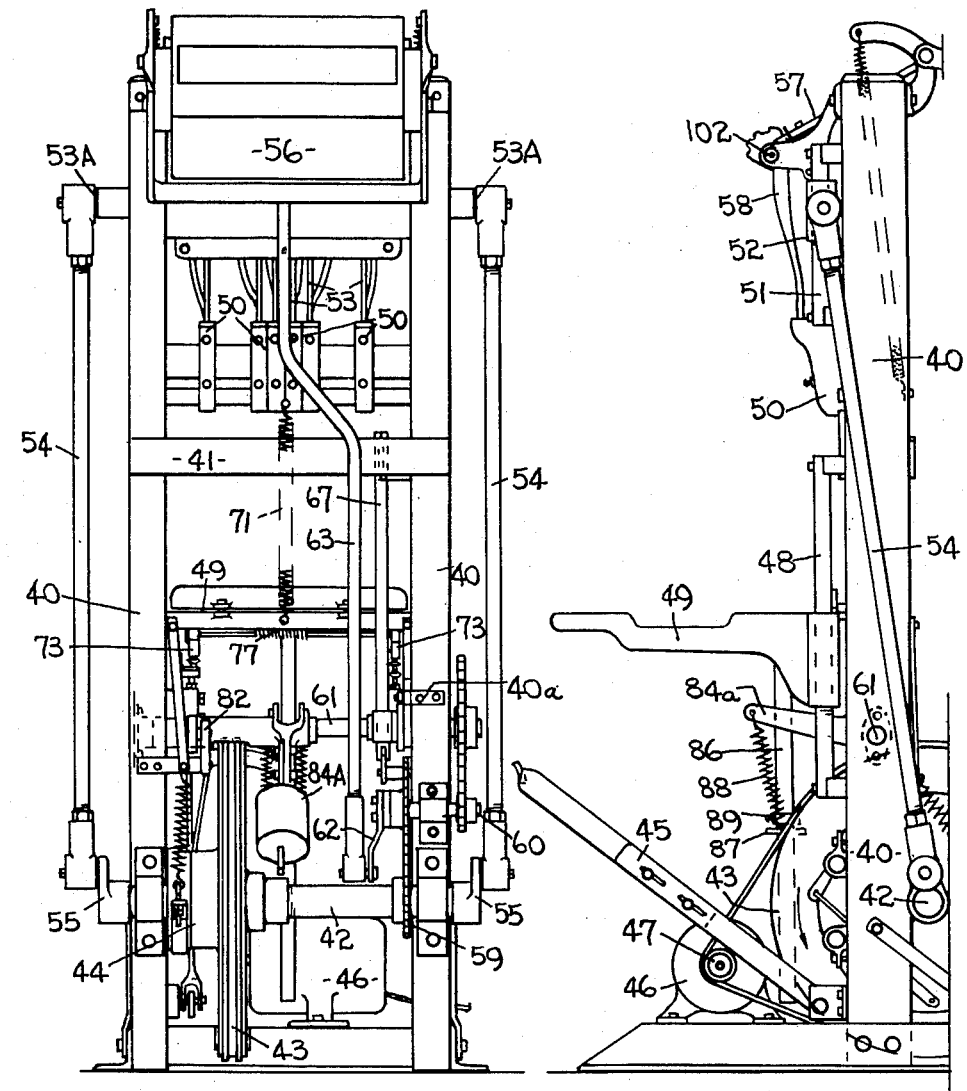

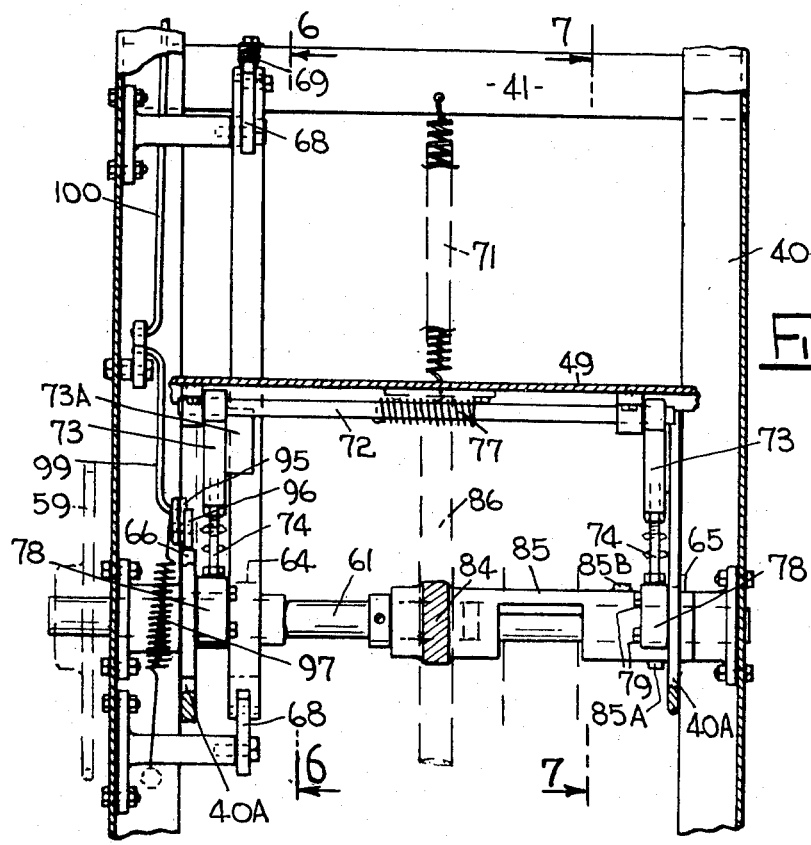
Fig. 5
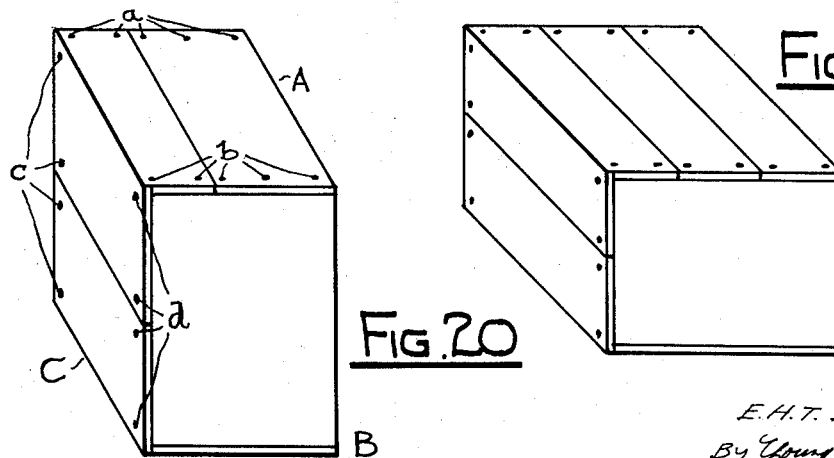
Fig. 20
Fig. 21
INVENTOR
E.H.T. BENSEMANN
By Young Emery & Thompson
ATTYS.

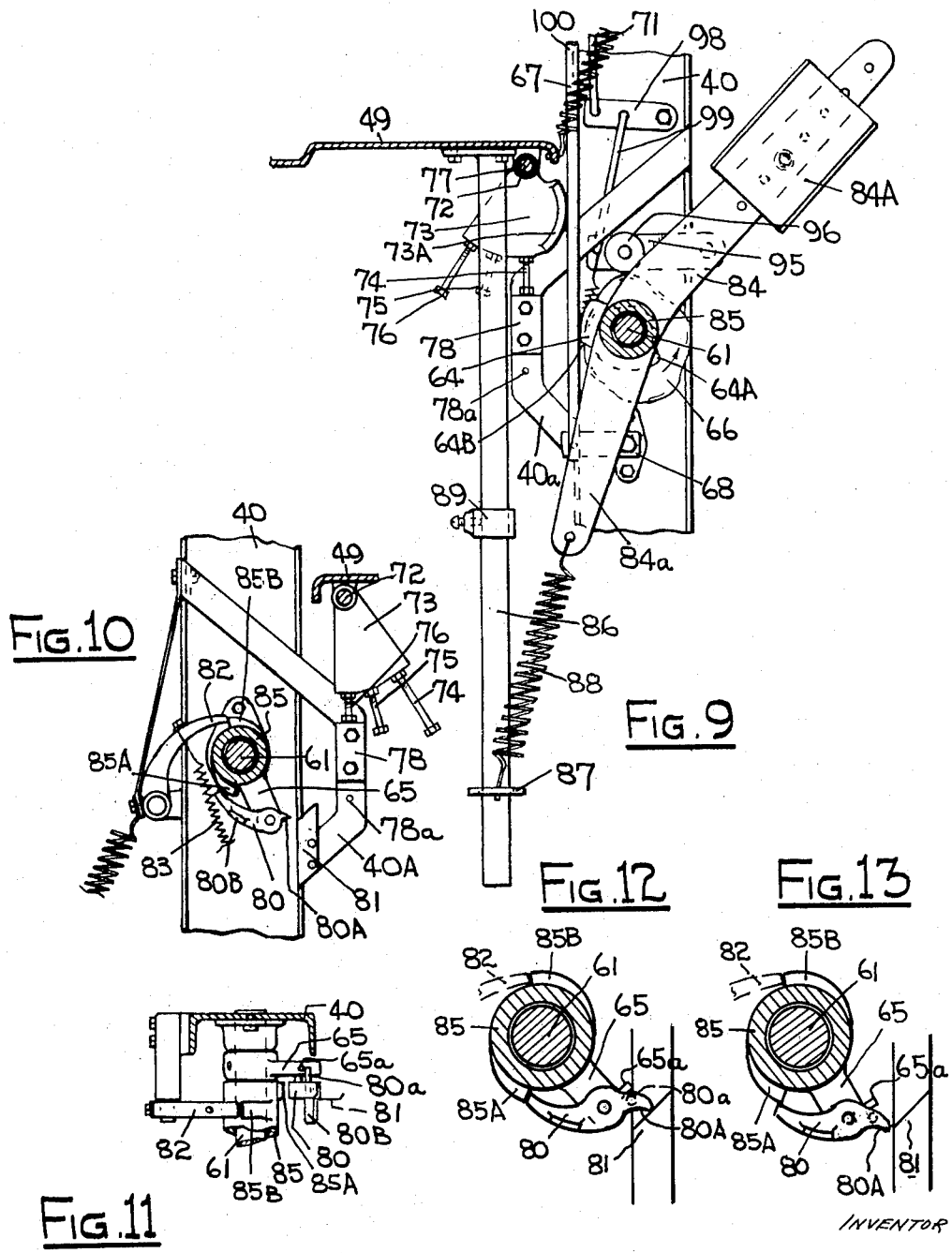

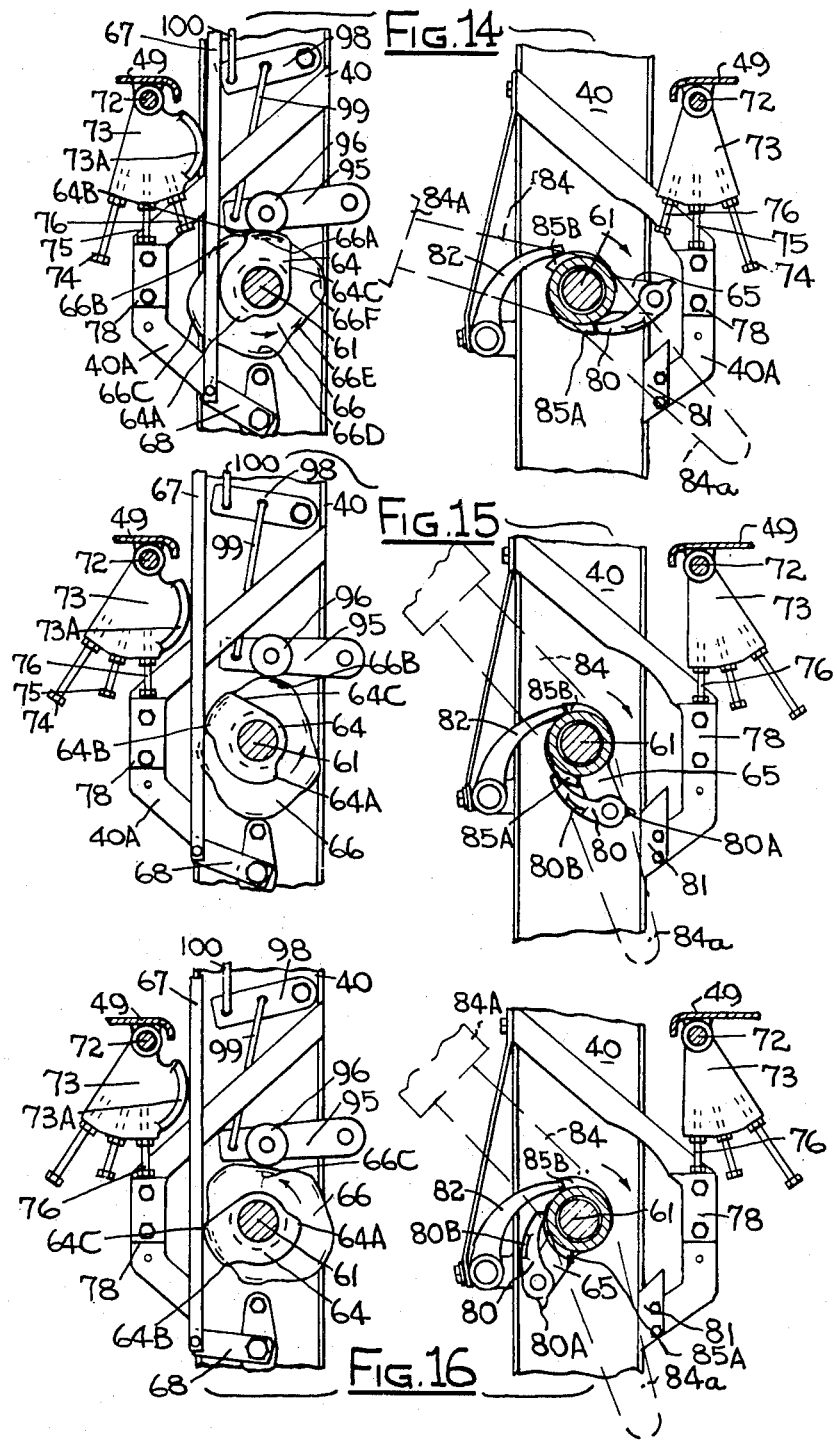

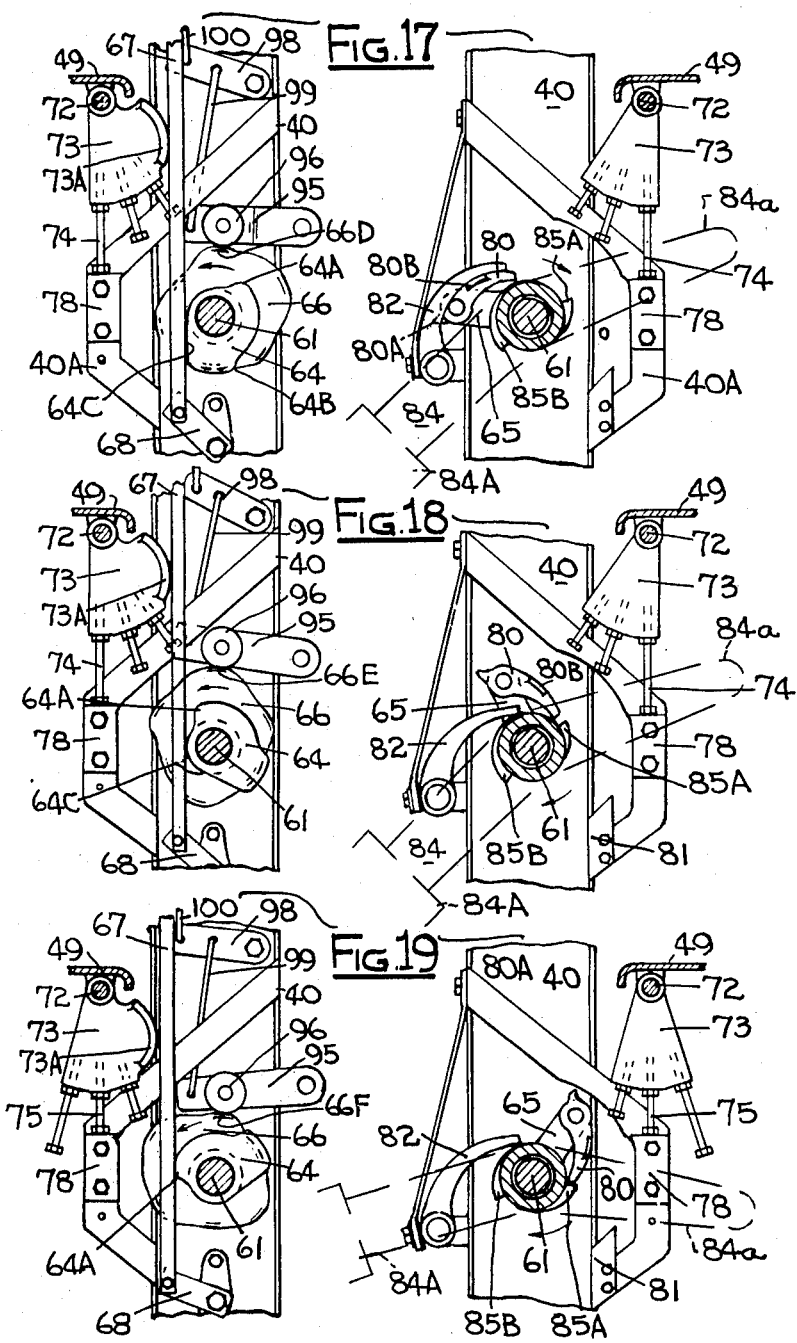

Jan. 31, 1956  E. H. T. BENSEMANN  2,732,552
BOX NAILING MACHINES

Original Filed March 5, 1948  8 Sheets-Sheet 8

INVENTOR
E. H. T. BENSEMANN
By Young, Emery & Thompson
ATT'YS.

United States Patent Office 2,732,552
Patented Jan. 31, 1956

2,732,552

BOX NAILING MACHINES

Edward H. T. Bensemann, Wellington, Wellington, New Zealand, assignor to N. Z. Inventions Development Company Limited, Wellington, Wellington, New Zealand, a New Zealand company Original application March 5, 1948, Serial No. 13,157. Divided and this application August 31, 1953, Serial No. 377,577

15 Claims. (Cl. 1—15)

This invention relates to improvements in machines adapted for use in the nailing of boxes of various sizes and types in a sequence or cycle of operations which permit of such boxes to be completed in one handling.

This application is a division of parent Application Serial Number 13,157, filed March 5, 1948.

The main object of my invention is to provide means for raising and lowering a work supporting table in a predetermined sequence so that varying dimensions of a box are compensated for as the construction of the box progresses.

According hereto an aspect of my invention is for a box nailing machine comprising nailing means, driving means for actuating the nailing means, a work supporting table positioned below the nailing means, means by which said table can be supported at selected nailing positions in accordance with the depth of the article to be nailed, means actuated by the said driving means to cause the table to drop by gravity in successive steps from its highest to its lowest nailing position, and means releasable by the said driving means for returning the table to its highest position.

In the following full description of the invention and its working, which description is made in relation to the accompanying drawings, the machine is described and shown as being concerned with a cycle of six operations in which the work supporting table is positioned and held at its highest level for one set of operations, at its second level for a further set, and at its lowest level for a third set of operations. These, however, may be varied to meet any desired circumstances, as the sizes of the boxes to be produced, the means devised for this purpose being such as to provide for the table and box assembly being raised and lowered automatically in the operations of the machine in a desired sequence.

Referring to the drawings appended hereto:

Figure 3 is a general rear elevation of the machine;

Figure 4 is a right hand, or reverse, side from that shown in Figure 2, and also omitting certain minor parts;

Figure 5 is a detailed vertical sectional view taken on the line 5—5 of Figure 2, but on an enlarged scale, of certain exposed portions of the table adjustment means;

Figure 6 is a sectional side view taken on the line 6—6 of Figure 5 of certain working mechanisms of the table adjustment means in one position;

Figure 7 is a sectional side view, taken on the line 7—7 of Figure 5, of certain control mechanism of the table adjustment means in a position relative to parts shown in Figure 6;

Figure 8 is an elevation of a holding pawl, lifting pawl, and associated parts shown in Figure 7;

Figure 9 is a view similar to Figure 7, but with the mechanism in another working position;

Figure 10 is a detailed sectional side view taken on the line 10—10 in Figure 1, on an enlarged scale, more specifically of part of the table adjustment means in another position, which position is relative to that illustrated in Figure 9. This figure may also be allied as a general cross section looking to the right in Figure 5;

Figure 11 is a fragmentary plan view of certain features of Figure 10, details of which are later described;

Figure 12 is an enlarged detail view showing the lifting pawl at a position where it is about to be released;

Figure 13 is a similar view to Figure 12, showing the lifting pawl released;

Figures 14 to 19 are composite views, the pair of each figure being taken on the common centre line as represented by C. L. in Figure 5, and illustrate the position of the working parts in the first and each subsequent position in the six strokes in the machine's cycle of operations;

Figure 20 is a view in oblique parallel projection of one box of certain dimensions and construction;

Figure 21 is a similar view to Figure 20 of another type of box of different dimensions and construction;

Figure 23 is a right hand side elevation of the lower portion of the machine illustrating a modified form later referred to.

Figures 1, 2:
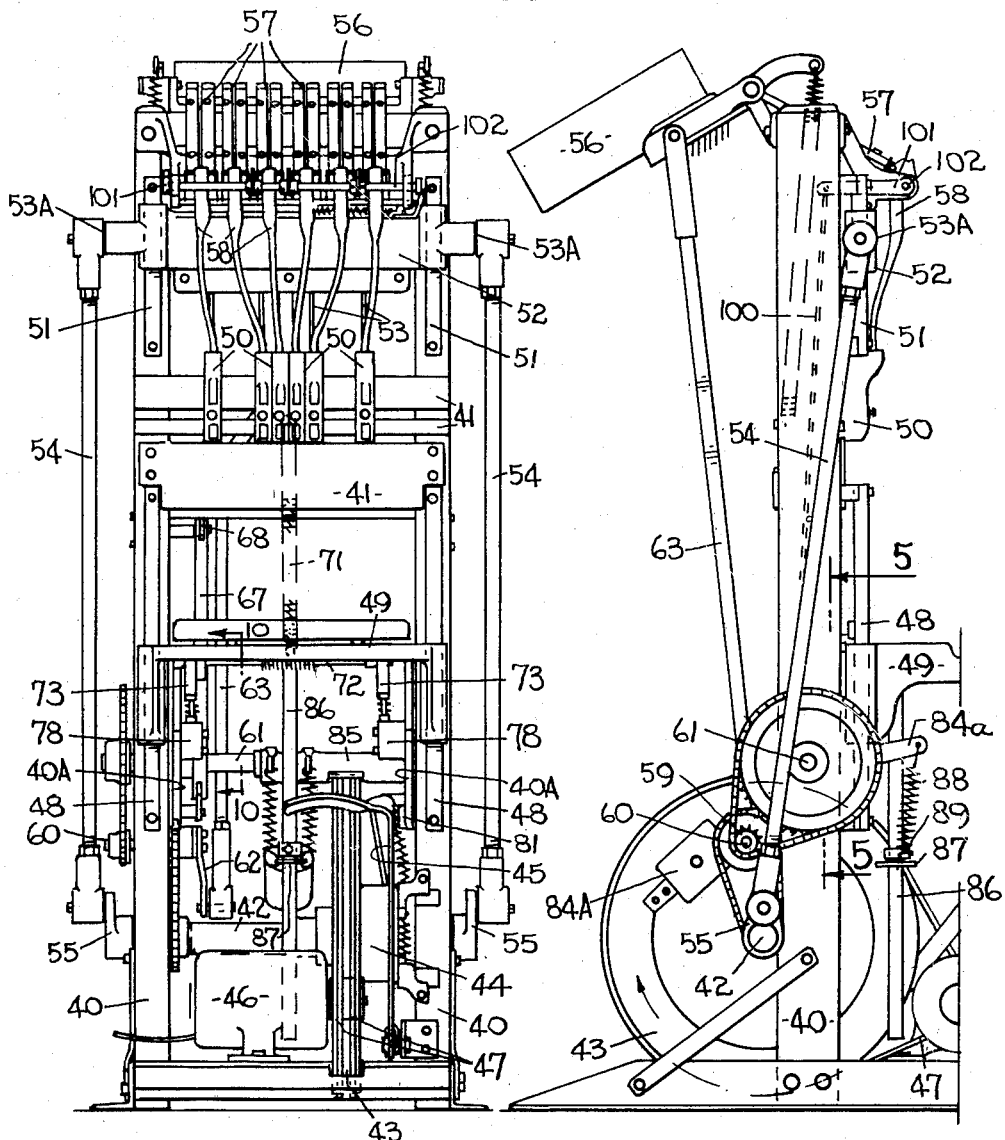
Figure 1 is a general front elevation of the complete machine.
Figure 2 is a left hand side elevation with certain unimportant parts omitted.

Referring to the main figures of the drawings, there is provided a vertical frame formed by two side standards 40, preferably of channel cross section arranged with their channels facing inwards to each other, which standards are fixed to base members and braced together by cross bars 41 positioned at certain positions in the height of the frame. A power shaft 42 is journalled to extend across the lower part of the frame and disposed on this shaft is a large flywheel 43 which is associated with a conventional sliding clutch mechanism 44 not detailed in the drawings, connected with a control lever 45 extending out from the front of the machine. An electric motor 46 is secured at the base of the frame and is connected to the flywheel 43 through a pulley and belt drives 47.

Extending up in front of each standard 40 (Figure 1) in the lower part of the frame is a guide rod 48, and on these two rods a work supporting table 49 is slidably mounted. Above the table and slidably affixed to two of the frame's cross bars 41 are a number of nailing chuck units 50. Also extending up in front of each standard 40, in the upper part of the frame, is a further guide rod or bar 51 and on these two bars a crosshead block 52 is slidably mounted; and slidably secured in the crosshead's lower side are a number of nail driving punches 53, one adapted to pass through each nail chuck unit 50. The crosshead 52 has a stub axle 53A extending out from each of its ends and on this is journalled an end of a long connecting rod 54, which rod extends down at a side of the frame for the other end of the rod to be journalled on the pin of a crank 55 attached to the respective ends of the power shaft 42.

A nail holding magazine or hopper 56 is carried upon the top of the frame by pivoting its forward edge thereto, and leading from this hopper are a number of inclined nail support guides 57. These guides are combined through feeding mechanisms to the ends of a number of funnels or chutes 58 which lead down into the nail chuck units 50. The foregoing features are known in respect of box nailing machines, but their inclusion is necessary for a working description of the invention later appended in this specification.

In this invention the power or drive shaft 42 is geared by suitable means, such as the chain and sprocket gearing 59, as shown in drawing Figures 1, 2 and 3, first with a short intermediate spindle 60 which is journalled upon the rear of one of the frame standards 40 and then to a countershaft 61 which is journalled to extend across between the two standards 40 at a suitable height beneath the work supporting table 49. This gearing 59 is so designed as to provide for transmission of rotation from the drive shaft 42 to the countershaft 61 whereby the latter may be turned through a definite proportion of a rotation for each full rotation of the drive shaft. This proportionate turning of the countershaft 61 is fixed to accord with the full number of operations to complete nailing of boxes concerned with the machine's operations, as, for instance, the six operations previously referred to in which the countershaft may be turned through one sixth of a rotation for each full rotation of the drive shaft 42. Therefore, the gearing between countershaft 61 and drive shaft 42 is in 6:1 ratio. The gearing between the intermediate spindle 60 and the drive shaft 42 is in 2:1 ratio and later referred to.

The intermediate spindle 60 has fixed upon its inner end a crank arm 62, and a connecting rod 63 leads from this arm up to be pivoted to the nail magazine or hopper 56.

Certain movements in the operation of the table 49 are governed by a table drop cam 64 (Figures 5, 9 and 14), and a table control pawl arm 65 and a nail feed selecting cam 66, the cams being disposed at one end of the countershaft 61 and the pawl arm at the other end of such shaft.

A vertical bar 67 (Figure 6) extends up within the standard 40 at that end of the shaft 61 so that the bar's relative side may engage the peripheral edge of the cam 64. This vertical bar is carried at each of its ends upon a crank arm pivoted to the standard and is controlled by means of a tension spring 69 arranged between the top crank arm and the frame. This spring 69 is designed to cause the bar 67 to be forced rearwardly to maintain contact with the edge of the cam 64.

The table 49 mounted on its guide rods 48 as mentioned supra has a tension spring 71 (Figures 1 and 3) extending centrally from its rear to a frame cross bar 41 and has a spindle 72 journalled to extend along upon its underside near its rear side (see Figure 5). On each end of this spindle a quadrant device 73 (Figures 5 and 14-19) is fixed to extend radially downward and in the bottom edge of this quadrant three pins or legs 74, 75, 76, extend in radial lines from its spindle axis spaced one behind the other. These pins or legs are made to be of different lengths, increasing from the foremost (74) to the rearmost (76) and are screwed into the edge of the quadrant so that they may be adjustable as to their lengths. A helical spring 77 (Figure 5) surrounds the table spindle, being made fast between the table and the spindle and torsioned to normally turn the spindle 72 in a rearward direction. The quadrant device at the respective end of the table spindle is also provided with a shoulder 73A (Figures 14-19) for engaging the other side of the vertical bar 67 to that which engages the edge of the cam 64 on the countershaft 61.

At the inside of each standard 40 there is mounted on a bracket 40A a block 78 (Figures 6, 7, 9 and 10) on which the table 49 can be supported by means of the legs 74, 75 and 76. Each block 78 is positioned below the table so as to be on the same vertical plane as the nail driving chucks 53 (Figure 1) so that during the driving of the nails the blocks will receive the impact transmitted through the legs which will be supporting the table. The blocks are made adjustable in their mounting on the brackets 40A to which they are screwed by bolts 79 adapted to be screwed into holes 78a (Figures 6 and 7).

On the countershaft 61 from about midway of its length to one end thereof a sleeve 85 (Figures 5 and 9) is freely mounted but is adapted to be rotated with the shaft and released by controlling mechanism described infra. A double-ended lever 84 (Figures 5 and 9) is attached to one end of this sleeve which is of a length so that the lever is positioned about midway between the quadrants 73 (Figure 5). One end 84a of the lever 84 extends forwardly and the other end extends rearwardly (Figure 9). The lever being attached to the sleeve, these two parts will move together.

The rearward end of the lever 84 carries a counterweight 84A which is capable of adjustment along the length of the said end in order to adjust the power of the lever. Its forward end 84a is formed into a fork (Figures 1, 3 and 22), the inner sides of which are adapted to pass on each side of a stem 86 extending downwards from the underside of the table. The extremity of each side of the fork is connected to a ring 87 (Figures 1, 2 and 9) which is slidably mounted on the stem 86 by means of suspension springs 88 (Figures 1 and 9). A collar 89 is disposed upon the stem 86 above the ring 87 and is capable of being adjusted to any desired point along the stem, and is locked to the stem by a pinch screw in its adjusted position.

The weight of the table 49 is greater than that of the lever's weighted end 84A so that it will drop by gravity to a position where it will be supported by one of the respective legs 74, 75, 76, from each quadrant 73. The tension spring 71 is only sufficient to cushion the drop of the table from one position to the other and also to aid to some extent the rising of the table under the action of the counterweight when the latter falls from the position in Figure 9 to the position shown in Figure 6 by the dotted lines. During the time that the counterweight is in its raised position (Figure 9) the springs 88 are inactive. When the lever 84 is released the weight causes the lever to fall and the short end of the lever to raise the springs until such time that the sliding ring 87 reaches the stop 89. At this point the lifting end 84a of the lever is moving rapidly due to the momentum obtained by the falling weighted end with consequent increased energy caused by the acceleration. As soon as the upward free movement of the springs 88 is halted by the stop, the lever will, under its momentum, suddenly expand the springs thereby imparting tension to them. This tension, being of a resilient nature, will, by reason of the strength of the spring and the power imparted to the short arm by the falling weighted end, overcome the inertia of the table, thereby raising it.

This upward raising movement imparted to the table by the springs 88 is in the nature of a "bounce" and causes the table to rise from the position in Figure 9 to the position indicated in Figure 6, that is, with the legs 74 of the quadrants supported on the blocks 78. During this upward movement the legs would rise slightly above the blocks 78 so that they will not strike the blocks when the quadrants are moved rearwardly, under the torsion of the coil spring 77, to a position limited by the bar 67.

The action of the drop cam 64 in its operation of shifting the upright bar 67 for moving the quadrants forward and permitting them to return and the mechanism associated with the table control arm 65 for actuating and releasing the table raising lever 84 will now be described.

The drop cam 64 (Figures 6, and 14-19) is, as mentioned supra, secured to the countershaft 61 and is positioned behind the vertical bar 67. It is shaped on its peripheral edge with two shoulders or lobes 64A, 64B, spaced apart and with a flat face 64C arranged to be about opposite the arc of the lobe 64A and adjacent the lobe 64B, the relative position of the lobes and the face 64C together with its adjacent arc being such that they will engage against and govern the respective movements of the bar 67 for the three positions of the quadrants (Figures 14 to 19) during the operation of the machine.

In Figures 6, 17 and 18, the flat face 64C and its adjacent radius is shown retaining the bar 67 so that the leg 74 of each quadrant 73 is resting on its respective block 78 and supporting the table thereon.

Figures 19 and 14 show the lobe 64A (the direction of rotation being indicated by the arrow) having operated the quadrants to the position shown with the legs 75 supporting the table. Figures 15 and 17 show the lobe 64B having still further operated the bar 67 to swing the quadrants outwardly to support the table on the shortest legs 76.

On the other end of the countershaft 61 (Figures 10 and 14–19) to that to which the cam 64 is fixed the control pawl carrier arm 65 is so positioned and attached to be in a timed relationship for the cam's flat face 64C to be substantially at a right angle to the axis of the arm and diametrically opposite. The arm is provided with a small pin 65a (Figures 11–13) projecting radially from its outer or trailing edge in the direction of the arm's rotation, as shown in drawing Figures 12 and 15. This arm also has a control pawl 80 disposed at its inner side and pivoted in its outer end; this pawl is formed with a tail extension 80A beyond its pivot and is provided on its inner side with a wing or lug 80B extending laterally therefrom and on its outer side with a small pin 80a (see drawing Figures 14 and 17) projecting laterally therefrom. This lateral side pin 80a of the control pawl 80 is of a length necessary to cross the path of the radial end pin 65a of the carrier arm 65 in a rotation of the countershaft 61. A stop block 81 is fixed to the adjacent frame bracket 40A in a predetermined position whereby the tail extension 80A of the control pawl 80 may engage the block in the rotary travel of the countershaft, as later described.

On the framing standard 40 adjacent the carrier arm 65 and its control pawl 80 a holding or retaining pawl 82 is pivotally mounted so that it extends upwards and inwards to overlie and be in line with the wing lug 80B of the control pawl 80. This retaining pawl 82 is controlled by a tension spring 83 extending down from its centre to a fixture in the frame. This spring 83 is to cause the pawl to be forced normally downward.

The end of the sleeve 85 carrying the lever 84 is formed with an end or outer ratchet tooth 85A (Figures 5, 17 to 19) and an inner ratchet tooth 85B disposed at a distance apart in the circumferential line of the sleeve 85 with their edges opposed to the direction of the countershaft 61 and the affixed carrier arm 65 thereon. The outer ratchet tooth 85A is of a width and positioned on the sleeve to be in the line of travel of the end of the control pawl 80 and likewise the inner ratchet tooth 85B is of a width and positioned to be in a rotatory line with the end of the retaining pawl 82, this pawl being designed to allow for the turning of the sleeve 85 in the direction provided for in the operation of the machine but to engage the tooth and prevent any reverse rotation for a phase or period in such operation. The peripheral distances between the ratchet tooth are so relatively designed as to effect a periodic movement in correspondence with a predetermined sequence of the machine's operating strokes as later described.

The cam 66 affixed on the countershaft 61 is especially shaped on its peripheral edge with six equally spaced facings or lobes 66A–66F (Figure 6 and 14–19). A lever arm 95 (Figures 5 and 6) is pivoted on a pin 95a carried in a bracket 40a attached to the rear of the respective standard 40 (Figures 3 and 6) at that side of the frame and on this lever at its inner side a roller 96 is mounted. This roller rests on the edge of the cam 66. The free end of the lever 95 has a tension spring 97 extending down to a suitable fixture beneath on the standard; this spring has the influence to draw down the lever arm to maintain the roller 96 engaging the cam's edge. A further lever arm 98 is pivoted to the inside of this standard at a position above the first lever 95 and is attached thereto by a short rod 99 extending between the free end of the lower lever and medially in the upper lever. A long rod 100 leads upward from the free end of the second or upper lever 98 and is attached to the rear end of a crank arm 101 for operating a spindle 102 (Figures 1 and 2) for the purpose of actuating a nail selector mechanism which may be of the kind described in my co-pending application, Serial Number 377,541, filed August 31, 1953.

In Figures 6 and 17, as mentioned supra, the drop cam 64 is supporting the table at its highest position, the pawl 80 (Figure 7) having raised the holding pawl 82 clear of the tooth 85B and the end of the lever 84 carrying the counterweight in its lowest position.

As the shaft 61 commences to rotate in the direction of the arrow (Figures 6 and 18) the pawl 80 moves in its orbit around the axis of the shaft until it reaches the tooth 85A on the sleeve 85 and begins to raise the lever 84 as indicated in broken lines in Figure 19 where the drop cam has also been rotated to force the bar 67 against the shoulder 73A of the respective quadrant which, together with the quadrants at the other end of the spindle 72, will move outwardly so that legs 74 will be forced clear of the blocks 78 to permit the table to drop and to be supported by the legs 75.

When the pawl arm 80 and the drop cam 64 reach the position in Figure 14 the lever arm 84 has been still further raised, and in Figures 15 and 16 it has reached its highest position with the holding pawl 82 engaging the tooth 85B. During the movement from the position in Figure 18 to the position in Figure 19 the tail 80A will contact the sloping part of the stop block 81 (Figures 12 and 13) and will have disengaged the pawl 80 from the tooth 85A. The downward movement of the pawl is limited by the pin 80a and pin 65a. At the same time the lobe 64B of the drop cam 64 will have forced the quadrants outwards and the legs 75 off the blocks 78 so that the table drops to be supported by the short legs 76 (Figure 15).

In position (Figure 16) the holding pawl 82 is still retaining the lever 84 raised, the lobe 64B of the drop cam being near the end of its contact with the bar 67. When the position (Figure 17) is reached the flat face 64C of the cam will again permit the bar 67 to return under tension of its spring 69, while the tongue 80B of the pawl 80 will have raised the holding pawl 82 clear of the tooth 85B thereby releasing the sleeve 85 carrying the lever 84, which then falls to the position shown by the broken lines (Figures 6 and 17). This downward movement rotates the sleeve 85 in the opposite direction to that indicated by the arrow and raises by means of the springs 88 (Figures 1, 2 or 4) the stem 86 and thereby the table, the torsion spring 72 returning the quadrants 73 to the position shown in Figures 6, 7 and 17 to enable the table to again be supported on the longest legs 74 as described supra.

In the operation of the machine the respective positions of the table enable the sides and bottom of a box to be accommodated for nailing. As an example, the operations will be described for making up a box of the type shown in Figure 20 where the sides of the box are first to be nailed to the ends of which the edges receiving the sides are shorter than the edge receiving the bottom boards. To position the timber for nailing, the ends are placed in an upright position on the table beneath the nailing chuck units 50 with the boards of one side resting upon their upper edges, the table being then in the position shown in Figure 19. At this stage the machine would be at rest with the flywheel 43 running freely on the shaft 42 under action of the electric motor 46 through the belt transmission 47.

Upon actuation of the control lever 45 (Figures 1 and 2) to clutch in or engage the flywheel the drive shaft 42 will be rotated for a full rotation and then stopped.

In this one rotation of the drive shaft 42 the crank 55 and its ends will have, through its connecting rods 54, imparted a down and up movement to the crosshead block 52 which on its upward movement will operate the pusher finger 90 to move the rod 91 controlling the nail release mechanism. On the downward movement of the crosshead 52 the driving punches are actuated to drive the nails fed to the chuck units 50 from the nail support guides into the boards as at "a" in Figure 20.

During this rotation of the drive shaft the countershaft 61 will have been rotated through one-sixth of a revolution, i. e. from the position in Figure 19 to the position in Figure 14, where the drop cam 64 has not moved the bar 67 so that the table is still supported on the intermediate legs 75. This position, the mechanism being stationary, enables the operator to turn the box end to end so that the nails may be driven into the sides A and ends as at "b" (Figure 20) on the second rotation of the drive shaft 42.

During this second rotation, however, the countershaft 61 will turn through a further one-sixth of a revolution and will bring the drop cam 64 to the position in Figure 15 where its lobe 64B will operate the bar 67 to force the quadrants 73 outwards so that the table will drop and be supported by the short legs 76. During a portion of the movement from the position in Figure 14 to that in Figure 15, the pawl 80 will still be rotating the sleeve 85 for the continued raising of the counterweight, but just before the position in Figure 15 is reached the lifting pawl 80 will be disengaged from the tooth 85A, but the sleeve will still be held by the holding pawl 82. The parts of the box so nailed are now withdrawn from beneath the nailing chucks and turned over so that the nailed sides rest on the table, the boards B for the other side being placed in position on the ends. Since the table has dropped, after the last nailing, to the second position (Figure 15) the required distance is provided to accommodate the increased overall thickness brought about by the addition of the remaining sides.

The third rotation of the shaft 42 is now effected by the operator to nail one end of these latter placed sides, and during this rotation the movement imparted to the drop cam 64 to the position of Figure 16 will not affect the position of the quadrants 73 or the position of the sleeve 85 and its lever 84 which, as will be seen, has its weighted end raised. After the nailing of this end of the sides the box parts are withdrawn from beneath the chucks and turned end to end for the nailing of the other end at the next rotation of the shaft 42.

During this fourth nailing operation, however, the drop cam 64 will reach the position in Figure 17 where the bar 67 will be moved by its spring 69 inwardly from its quadrant 73, which will also be free to move inwardly. Coincident with this position of the drop cam 64 the lifting pawl 80 has raised the holding pawl 82, by means of its tongue 80B, from engagement with the tooth 85B thereby releasing the sleeve 85 and allowing the lever's weighted end 84 to fall. The extent of the rotation of the sleeve after its release is indicated by the position of the tooth 85B.

As described supra, this action of the lever raises the table through the intervention of the springs 88 to its highest position where it is supported by the longest legs 74 of the quadrants.

It may here be explained that immediately this fourth nailing is completed the operator must then withdraw the box parts from beneath the nailing chucks because, unless they are withdrawn, the table would not be able to rise, i. e. "bounce," under the resilient blow imparted to it when the springs 88 are extended by the action of the lever 84 when its weighted end falls. The time available for the withdrawal of the box is not more than the time taken for the weighted end to complete its downward movement from its state of rest, and the time taken for the springs 88 to overcome the inertia of the table.

In this third position of the table (Figure 17) the distance between the table top and the nailing chucks will be decreased for the purpose of nailing the bottom of the box. For this purpose the already nailed box parts are turned to receive the bottom boards C, of which one end is nailed at c in the same manner as already explained in respect to the sides. During this fifth nailing the drop cam (Figure 18) will not operate the bar 67 while the pawl 80 will not have contacted the tooth 85A, so that the sleeve and lever 84 is not being moved. The box is now turned end to end for the final nailing at d. During the rotation of the shaft 42 for the sixth nailing the drop cam 64 and lifting pawl 80 will arrive to the position shown in Figure 19, where the pawl 80 will commence to rotate the sleeve and thereby commence to raise the lever 84, its position being indicated by broken lines. The drop cam 64, it will be seen, has moved the quadrants 73 to permit the table to drop and to be supported on the intermediate legs 75 ready for making up the next box.

Although the sequence of operations for nailing the different sides of a box has been described, commencing with the sides and ending with the bottom boards, the nailing could commence equally well at the bottom, in which case the position of the table in Figure 17 would first be used, as in the case of the box shown in Figure 21, where it is desired first to nail on the sides.

Depending upon the ratio of the train gearing 59 between the drive shaft 42 and the countershaft 61 this determines the number of nailing strokes per cycle of operations. In the description and drawings presented six strokes are provided for, four for nailing the sides of the box and two for nailing the bottoms. If the edges of the timber or boards forming the bottom and lid of the box being made up would be required to be nailed a cycle of eight operating strokes would be necessary. Other projects would require a lesser or a greater number of strokes per cycle of operations, so that the ratio of gearing is not limited to any particular order, or the number of shoulders or lobes on the feed cam 66 limited to any given number nor to the number of adjustable support legs of the table 49.

Also, the automatic control of the table to cause its level to be raised to and supported at a predetermined highest level and then, at required intervals during the performance of a fixed number or sequence of the nailing operations, to cause its level to be lowered and supported at each of a number of lower levels at stages in such nailing sequence, provides for other projects when the train of gearing is changed.

Figure 22:
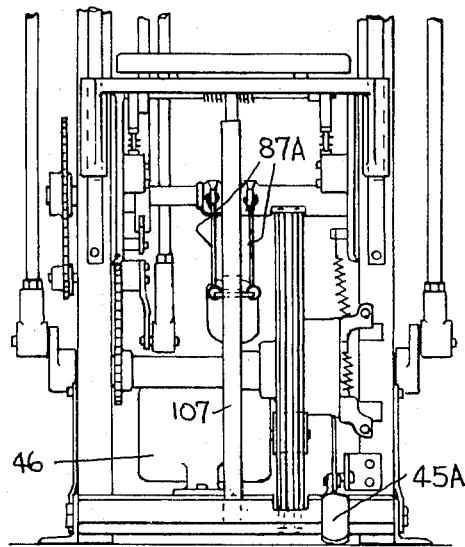
Figure 22 is a front elevation.
Figure 23:
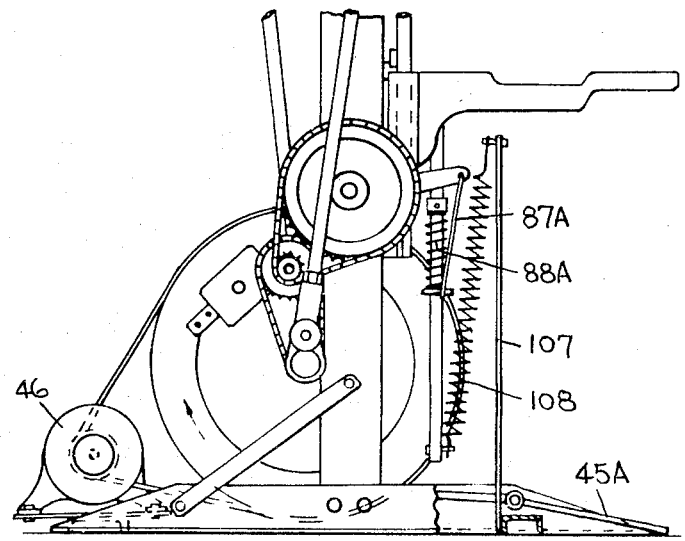

In Figures 22 and 23 of the drawings there is illustrated a modification in the constructions previously described. In this instance the electric motor 46 is mounted at the rear of the base, a foot control pedal 45A is connected to the clutch mechanism, links 87A are connected from the front end of the counterweight lever and the free ring on the table stem, a single spring 88A is arranged on the table stem between its fixed collar and the free ring. A post 107 is attached to the base of the machine to extend vertically to be below the table and a spring 108 is arranged between the top of the post and the bottom of the table stem. In this arrangement the springs 88A and 107 give an increased aid for table lift.

Having now described my invention what I claim is:

1. A nailing machine comprising nailing means, driving means for actuating the nailing means, a work supporting table positioned below the nailing means, means by which said table can be supported at selected height nailing positions in accordance with the depth of the article to be nailed, means actuated by said driving means to cause the table to drop by gravity in successive steps from its highest to its lowest nailing position, and means releasable by the said driving means for returning the table to its highest position.

2. A box nailing machine comprising nailing means, driving means for actuating the nailing means, a work supporting table positioned below the nailing means, means providing for automatically adjusting the table including a counterweight leverage mechanism and resilient means connecting the same with the supporting table, a control pawl mechanism actuated by the driving means and by the counterweight leverage mechanism to provide for progressively raising a counterweight in the leverage mechanism and then to provide for its release to lift the table, and means disposed beneath the table to retain the said table at a highest or a certain lower level in a predetermined sequence to the nailing means.

3. A box nailing machine comprising a frame, nail driving means carried by the frame, a work supporting table mounted on the frame beneath said nail driving means and slidable for vertical adjustment, means for supporting the table at a highest and at lower levels, a shaft journalled in the frame below the table, a weighted lever pivoted on said shafts, spring lift means connecting the lever and the table, lifting pawl means pivoted on the frame and cooperating with the nail driving means whereby the pawl may controllably raise the lever's weight end and then provide for its release to raise the table through the lift spring means in a predetermined sequence to the nail driving means and a number of legs of varying lengths disposed upon the table to support same upon the machine at a highest or any lower level.

4. A box nailing machine comprising a frame, nail driving means carried by the frame, a work supporting table mounted on the frame beneath said nail driving means and slideable for vertical adjustment, means for supporting the table at a highest and at lower levels, a lifting stem secured to the underside of the table, a countershaft journalled in the lower part of the frame, a power drive shaft journalled in the frame below the countershaft, drive means between the power drive shaft and the countershaft to effect a rotation of the latter through a series of proportional movements, a lever freely mounted upon the countershaft having one end disposed to extend in one direction below the table and the other end in an opposite direction, table lift spring means connected with the end of the lever extending below the table and with the lifting stem, a counterweight adjustably mounted upon the other end of the lever, lifting pawl means combined with the countershaft for progressively raising the lever's weighted end in the movement of the countershaft then releasing said lever to permit the raising of the table through the said lift spring means, and a number of adjustable legs of varying lengths disposed to extend from the underside of the table to support same within the machine at its highest or any predetermined lower level.

5. A box nailing machine comprising a frame, nailing chucks each having a vertically arranged driving punch and slidably secured across the upper end of the frame, a power driving shaft journalled in the lower part of the frame, drive means for connecting said shaft with the nail driving punches of the chucks to cause the punches to be lowered and raised upon each rotation of the shaft, a work supporting table mounted on the frame beneath the said chucks and slidable for vertical adjustment, a lifting stem secured to the underside of the table, a countershaft journalled to and extending across the lower part of the frame, drive means between the drive shaft and the countershaft to effect a partial rotation of the latter by a series of proportional movements on each full rotation of the drive shaft, a lever rotatably mounted upon the countershaft having one end disposed to extend in one direction below the table and the other end in an opposite direction, a counterweight for the table adjustably mounted upon the said other end of the lever, spring means upon the first-mentioned end of the lever for engaging the lifting stem of the table, lifting pawl means coupled with the countershaft for progressively raising the end of the lever on which the weight is mounted and for releasing it to lift the table during the proportional movements of the countershaft, and a plurality of adjustable legs disposed upon the underside of the table to support the table upon the frame.

6. A nailing machine comprising nailing chucks, nail feed mechanism for the nailing chucks, a work receiving table mounted and guided to have limited up and down movement beneath the chucks, table supporting members articulated to the underside of the table and adapted to support the table at predetermined distances from the nailing chucks, means to actuate the said supporting members to permit the table to drop from one supported position to the next after a predetermined number of nailing operations at each position until the lowest position is reached, table raising means connected resiliently to the table for returning said table to its highest position, and means combined with said table raising means to actuate the table raising means and to permit said raising means to be released in order to raise the table after a predetermined number of nailing operations while the table is in its lowest position.

7. A nailing machine as claimed in claim 6, wherein the table supporting members comprise quadrants pivoted to the table on the underside thereof, each of said quadrants having a plurality of legs each of a different length to support the table the predetermined distances from the nailing chucks, and spring means interposed between the table and the quadrants to return said quadrants against their actuating means.

8. A nailing machine comprising nailing mechanism, nail feed mechanism for the nailing mechanism, a work receiving table mounted and guided to have limited up and down movement below the nailing mechanism means to support said table at predetermined nailing positions, means to actuate said table supporting means to permit the table to drop from one nailing position to the next until the lowest is reached, table raising means including a counterweight to overcome resiliently the inertia of the table upon the fall of the counterweight, actuating means for raising the counterweight and releasing the said counterweight to permit it to fall so that the table raising means will raise the table to its highest position.

9. A nailing machine comprising nailing chucks, nail feed mechanism for the nailing chucks, a work receiving table mounted and guided to have limited up and down movement below the nailing chucks, table supporting means adapted to support the table at predetermined distances from the nailing chucks, means to actuate the said supporting means to permit the table to drop from one supported position to the next after a predetermined number of nailing operations at each supported position until the lowest position is reached, a counter-weighted lever resiliently connected to said table, means to actuate the said lever to raise its weighted end during the nailing operations, means to retain said lever in its raised position, means to release said lever to permit its weighted end to fall in order that its other end will resiliently overcome the inertia of the table and raise it to its highest position after a predetermined number of nailing operations during the time the table is in its lowest position.

10. A nailing machine as claimed in claim 9, wherein the resilient connection of the said lever to the table comprises a rod connected to the underside of the table and extending downwardly therefrom, an adjustable stop on said rod and spring means interposed between the lever and said stop.

11. A nailing machine as claimed in claim 9, wherein the resilient connection of the said lever to the table comprises a rod connected to the underside of the table and extending downwardly therefrom, an adjustable stop on said rod, a ring slidable on said rod, and springs connecting the unweighted end of said lever to the said ring.

12. A nailing machine as claimed in claim 11, wherein the table supporting means comprise members movable together and pivoted to the table on its underside, each of said members having legs corresponding in number to the number of nailing positions, supporting blocks on which the legs can stand, each leg being of a length to support the table for a respective nailing position, a vertical bar positioned opposite a member and suspended from arms pivotally mounted on the said frame, a drop cam on said countershaft, positioned to bear against said bar and shaped to move said bar against its member and force a supporting leg from its block to permit the table to drop after a predetermined number of nailing operations in each supported position.

13. A nailing machine comprising a frame, nailing chucks, nail feed mechanism for the chucks, a work table mounted and guided to have a movement towards and away from the chucks, supporting means for the table, means to actuate said supporting means to permit the table to drop from one nailing position to the next after a predetermined number of nailing operations until the lowest position is reached, a countershaft mounted in the frame and rotatable during the said nailing operations, a sleeve on said countershaft, a counterweighted lever attached to said sleeve and resiliently connected at its unweighted end to the table, lifting means carried by said countershaft to actuate said lever during the nailing operations until its weighted end reaches its highest raised position, holding means to retain said lever after its highest raised position is reached, and releasing means combined with said lifting means to disengage, after a predetermined interval, said holding means in order to permit the lever to drop and thereby to raise the table.

14. A nailing machine as claimed in claim 12, wherein said lifting means comprise an arm fixed to said countershaft, a lifting pawl pivoted on said arm to engage a tooth on said sleeve, and a releasing tongue carried by said lifting pawl to disengage said holding means.

15. A nailing machine as claimed in claim 12, wherein the holding means comprises a pawl pivoted to the frame of the machine to engage a tooth on said sleeve to retain said lever during the said predetermined interval.

No references cited.